Aug. 1, 1967

N. L. STAUFFER 3,334,351

INK DROPLET RECORDER WITH PLURAL NOZZLE-VIBRATORS

Filed June 16, 1965

INVENTOR.
NORMAN L. STAUFFER

BY Arthur H. Swanson

ATTORNEY.

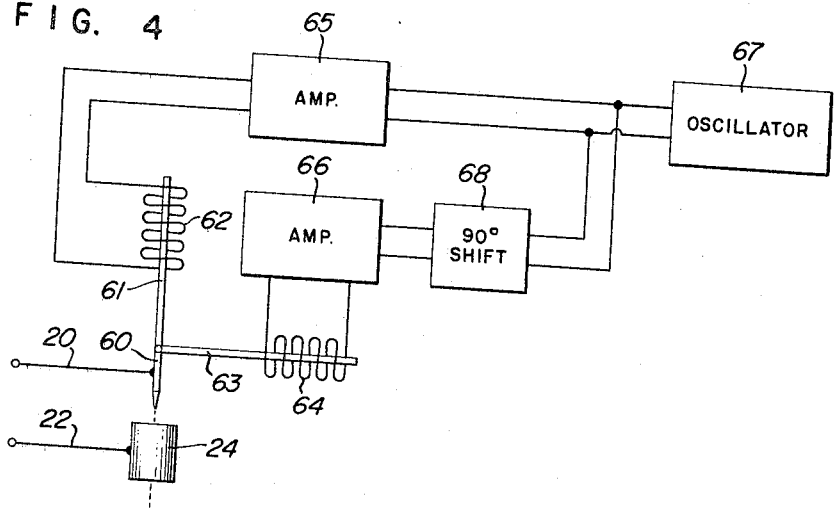
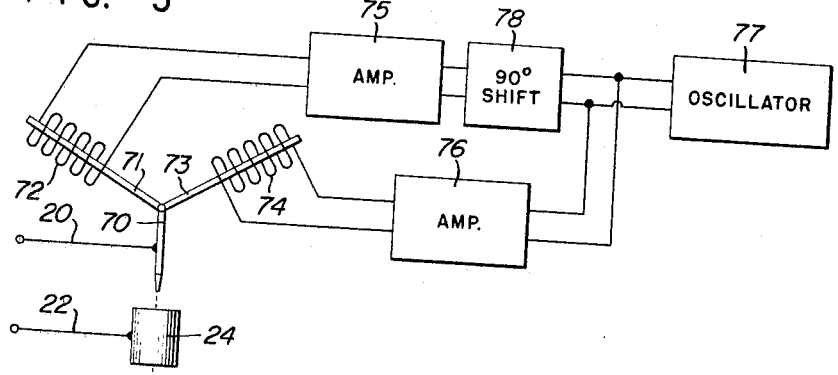

United States Patent Office 3,334,351
Patented Aug. 1, 1967

3,334,351
INK DROPLET RECORDER WITH PLURAL NOZZLE-VIBRATORS
Norman L. Stauffer, Englewood, Colo., assignor to Honeywell Inc., Minneapolis, Minn., a corporation of Delaware
Filed June 16, 1965, Ser. No. 464,491
10 Claims. (Cl. 346—75)

This invention relates to signal recording apparatus. More specifically, the present invention relates to a direct writing signal recording system.

Subject matter shown but not claimed herein is shown and claimed in a copending United States application of Richard G. Sweet, Ser. No. 354,659, filed on Mar. 25, 1964.

It is an object of the present invention to provide an improved recording system as set forth and wherein direct ink recording is employed while obviating the necessity for a physical engagement between a stylus and the record member.

It is another object of the present invention to provide an improved recording system as set forth for direct ink recording and incorporating an arrangement for providing a uniform stream of recording ink having stable droplets.

It is a further object of the present invention to provide an improved recording system as set forth for direct ink recording which is effective to permit a recording operation using discrete successive droplets of ink which are free of undesired irregular droplets.

In accomplishing these and other objects, there has been provided, in accordance with the present invention, a recording instrument wherein a jet of writing fluid; e.g., ink, is caused to be issued from a recording nozzle in the form of a succession of tiny individual droplets which are directed toward the surface of a record member. As the individual droplets are formed, they are given an electrostatic charge which is a function of the instantaneous value of an input signal which is to be recorded and, then, caused to pass between a pair of electrostatic deflection plates. As the charged droplets pass through the electric field, they are deflected from their normal path by an amount which is a function of the magnitude of the charge on each of the droplets and in a direction which is a function of the polarity of the charge on the individual droplets. The recording nozzle is simultaneously vibrated in two separate planes to form uniform ink droplets free of irregular droplets. Separate vibrating means are used to induce a nozzle vibration in respective planes.

A better understanding of this invention may be had from the following detailed description when read in connection with the accompanying drawings, in which:

FIG. 4 is a pictorial view of a modification to the apparatus shown in FIG. 1 embodying the present invention.

FIG. 5 is a pictorial view of another embodiment of the present invention.

Figure 1:
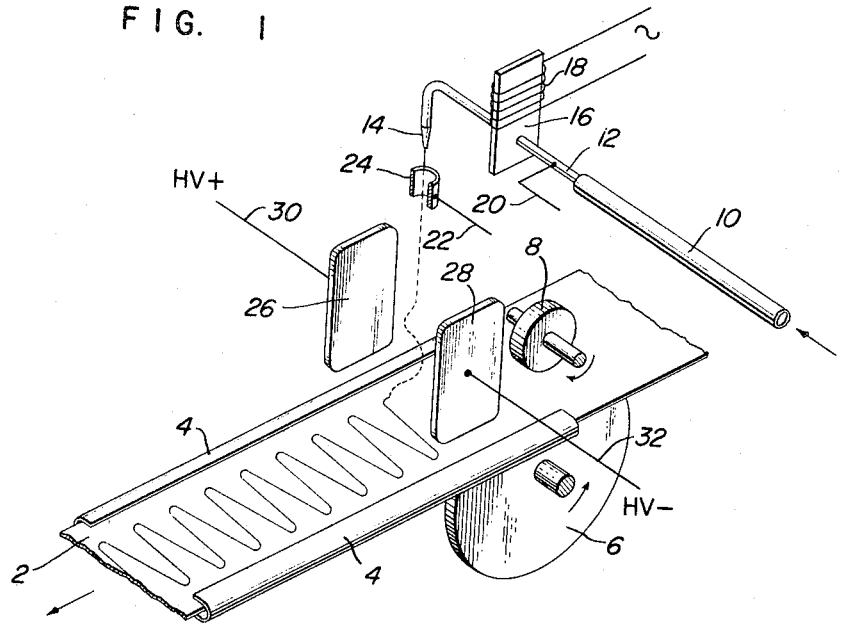
FIG. 1 is a perspective view of a basic recording apparatus for use with the present invention.

Referring now to the drawings in more detail, there is shown in FIG. 1 an apparatus which illustrates the basic recorder used with the present invention. This apparatus includes a record receiving member 2, such as a strip of record paper, which is arranged to be driven through a suitable paper guide 4 by means of a drive roller 6 and a pressure roller 8. Record writing fluid is supplied to the system through a tube member 10, a feed pipe 12 and a nozzle 14 under a hydrostatic pressure head of between 40 and 100 lbs. per square inch. The writing fluid, or ink, issues from the nozzle 14 in a jet which may be on the order of 1/1000 of an inch in diameter. Issuing thus from the nozzle, the jet has a natural tendency, due at least in part to surface tension of the fluid, to break up into a succession of tiny droplets. In order to assure that the droplets will be substantially uniform in dimension and frequency, means are provided for introducing regularly spaced varicosities in the issuing jet. These varicosities, or undulations in the cross-sectional dimension of the issuing jet stream, are made to occur at or near the natural frequency of the formation of the droplets. This frequency may typically be on the order of 120,000 per second. In the basic structure shown in FIG. 1 the varicosities are introduced into the issuing jet stream by vibrating the feed pipe 12, hence the nozzle 14, at the desired frequency. This is accomplished by means of a magnetostrictive driving element 16 for the pipe 12 which element is excited by a suitable driving coil 18.

In accordance with this structure, the signals to be recorded are applied directly to the writing fluid. In accomplishing this, it is assumed that the writing fluid, or ink, is itself electrically conductive. The signal to be recorded is applied to the instrument from an input signal control 19 over a first and second lead wire 20 and 22, respectively. The first lead wire 20 is connected to the feed pipe 12, if that feed pipe 12 is made of electrically conductive material. Otherwise, the lead 20 is connected through the wall of the feed pipe 12 into engagement with the ink therein. The second lead wire 22 is connected to a tubular charging ring or electrode 24. The charging electrode 24 is positioned relative to the nozzle 14 such that the actual formation of the discrete droplet occurs within the region surrounded by the electrode 24. The input signal control 19 is effective to apply a signal to the lines 20 and 22 corresponding to an input signal to be recorded. Thus, as an individual droplet separates from the continuous stream of the ink supply, it carries with it an electrostatic charge which is proportional to the instantaneous value of the input signal at the instant of separation. Thus, each droplet of ink or writing fluid will have its own unique charge characteristic.

These droplets are directed, at relatively high velocity, toward the surface of the record receiving member 2. In their path towards the surface of the record receiving member 2, the droplets are caused to pass between a pair of electrostatic deflecting electrodes or plates 26 and 28, respectively. These plates 26 and 28 are oppositely charged to a relatively high constant voltage. The deflecting plate 26, might, for example, be charged to a positive 8,000 volts through the lead 20, while the plate 28 might be charged to a negative 8,000 volts through the lead 32. This produces an electric field between the two plates having a total potential difference of 16,000 volts with the two plates spaced about one-half inch apart. As the individually charged droplets pass through the electric field thus produced, they are individually deflected from their straight line path by an amount which is a function of the magnitude of the charge on the particular droplet. The direction of the deflection will be determined by the polarity of the charge on the droplet relative to the electric field.

Figure 2:
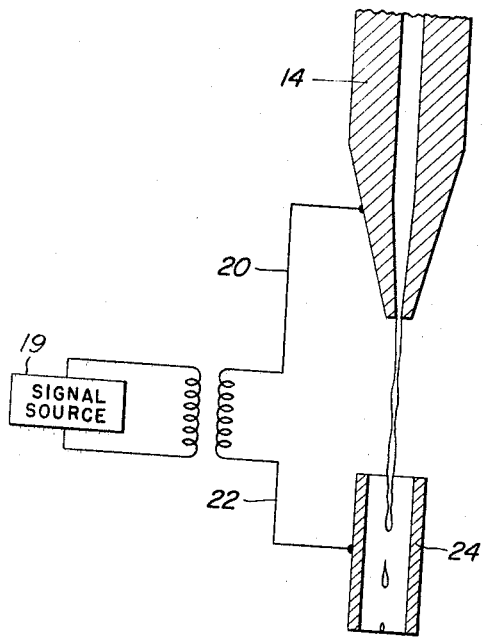
FIG. 2 is a side view in partial cross-section of the apparatus shown in FIG. 1.

Since the charge on the deflection plates is constant and the signal to be recorded appears as a charge on the individual droplets, the frequency response capability of the recording instrument is limited only by the frequency of the recurrence of the individual droplets. With the droplets occurring at the rate of 120,000 per second, it is apparent that the frequency response characteristic of the recorder approaches one-half of the recurrent frequency of the droplets themselves as a practical limit. The aforesaid relationships are more clearly shown in the pictorial cross-sectional representation of FIG. 2.

Figure 3:
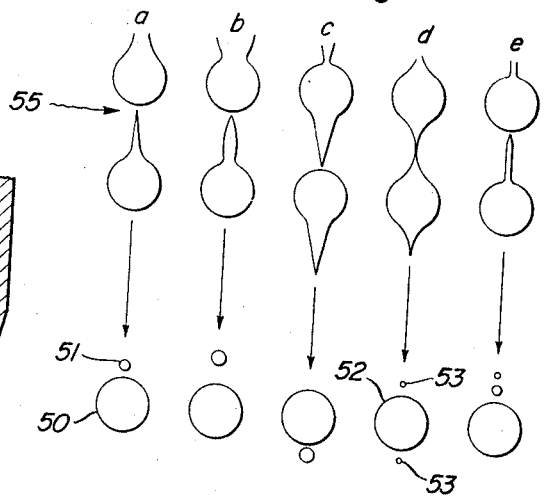
FIG. 3 is a pictorial illustration of various types of irregular ink droplets observed with the apparatus illustrated in FIG. 1.

In FIG. 3, there is shown a series of irregular ink droplets observed with the basic recording apparatus shown in FIG. 1. These droplets comprise a main uniform droplet 50 and an undesired secondary, or satellite, droplet 51 as shown in groups a, b, and c of FIG. 3. Groups d and e of FIG. 3 show a main droplet 52 and a plurality of satellite droplets 53. These main droplets and satellite droplets are formed by various dislocation effects during the process of forming the recording ink droplets by the nozzle 14 as shown generally at 55 in FIG. 3. The effect of these satellite droplets is detrimental to the recording process in several ways. Since the charge which a droplet receives is roughly proportional to its surface area and its mass is proportional to its volume, the charge to mass ratio will be inversely proportional to the drop radius. The smaller satellite drops, thus, have a higher ratio of charge to mass and will be displaced a greater amount than the main drops. This will cause them to appear on the recording medium as a faint trace superimposed on the main trace. At the extremes in deflection of the main drops, the satellite drops are able to strike the deflection plates 26 and 28 whereby they accumulate and eventually produce arcing between the deflection plates. Accordingly, it is desirable to produce uniform droplets without satellite droplets in order to improve the operation of the recording system.

In FIG. 4, there is shown a modification of the basic recorder structure of FIG. 1 which modification embodies the present invention. This novel modification is provided for the purpose of effecting the formation of uniform ink droplets in a recording stream without satellite droplets. The basic recording structure from FIG. 1 is only partly shown in FIG. 4, in order to clarify the modified structure, with similar numbers indicating similar elements. As shown in FIG. 4, a recording nozzle 60 is provided with a first megnetostrictive driving element 61 driven by coil 62 for inducing an oscillation of the recording nozzle 60 in the direction of the path of the recording droplets while a second magnetostrictive driving element 63 is positioned on the nozzle 60 and displaced 90° with respect to the first driving element 61 to induce a transverse oscillation of the nozzle. The second element 63 is driven by a driving coil 64. The coils 62 and 64 are energized by amplifiers 65 and 66, respectively. The amplifiers 65 and 66 may be provided with adjustable signal gain control means in order to balance the effect of the driving means 61 and 63. An oscillator 67 is used to directly drive the first amplifier 65 while the second amplifier 66 is energized through a 90° phase shift means 68. The effect of the second driving means 63 is to impart a rolling motion to the ink droplets in order to induce a capture of and inhibit formation of satellite drops within the main drops during the droplet formation process.

In FIG. 5 there is shown an alternate modification of the basic recorder structure shown in FIG. 1 to effect the production of uniform recording ink droplets. In this structure, a nozzle 70 is provided with a first magnetostrictive driving means 71 driven by a coil 72 and a second similar driving means 73 driven by coil 74. The driving means 71 and 73 are displaced 90° with respect to each other and are symmetrically arranged on both sides of the ink stream. Thus, the driving means 71 and 73 are each displaced 45° from the ink stream. The drive coils 72 and 74 are driven by signals from amplifiers 75 and 76, respectively. The amplifiers 75 and 76 are energized by an oscillator 77 with the first amplifier 75 being energized through a 90° phase shift means 78 while the second amplifier is energized directly. The effect of the structure shown in FIG. 5 is to effect a combining of the main ink drops with the satellite ink droplets by providing a transverse and longitudinal motion to the ink droplets during the formation process. It may be noted that in either modification, other driving means such as piezoelectric may be used to oscillate the recording nozzle without departing from the scope of this invention.

Accordingly, it may be seen that there has been provided, in accordance with the present invention, an improved direct ink recorder using an ink stream of uniform individual droplets with means for eliminating the occurrence of undesired irregular, or satellite, droplets.

What is claimed is:

1. In a direct writing recorder for writing upon a recording medium, means for forming a discontinuous stream of writing fluid in the form of a succession of discrete droplets comprising a nozzle, a feed pipe connected to said nozzle for supplying writing fluid thereto, means for establishing a pressure head on said fluid in said pipe to cause said fluid to be projected from said nozzle toward the surface of said recording member, and means for introducing regularly spaced varicosities in the issuing stream of said fluid from said nozzle to assure the formation of droplets of uniform dimension, said last-mentioned means including a first vibrating means mechanically coupled to vibrate said nozzle, a second vibrating means mechanically coupled to vibrate said nozzle, and means for exciting said vibrating means at a desired frequency.

2. The invention as set forth in claim 1 wherein said first and said second vibrating means are arranged to induce vibrations of said nozzle in respective vibration planes which are displaced substantially 90° from each other.

3. The invention as set forth in claim 2 wherein said first means is arranged to vibrate said nozzle substantially co-linearly with said stream of said fluid.

4. The invention as set forth in claim 3 wherein said means for exciting includes a common source of oscillatory signals, means connecting said signals directly to said first means, and 90° phase shift means arranged to connect said signals to said second means.

5. The invention as set forth in claim 2 wherein said first means and said second means are symmetrically arranged with respect to said stream and are both displaced 45° with respect to the path of said stream.

6. The invention as set forth in claim 5 wherein said means for exicting includes a common source of oscillatory signals, means connecting said signals directly to said first means, and 90° phase shift means arranged to connect said signals to said second means.

7. A direct writing recorder for writing upon a recording medium comprising means for forming a discontinuous stream of writing fluid in the form of a succession of discrete droplets, said means including a nozzle, a feed pipe connected to said nozzle for supplying writing fluid thereto, means for establishing a pressure head on said fluid in said feed pipe to cause said fluid to be projected from said nozzle toward the surface of said recording member, means for introducing regularly spaced varicosities in the issuing stream of said fluid from said nozzle to assure the formation of droplets of uniform dimension, said last mentioned means including a first vibrating means mechanically coupled to vibrate said nozzle and a second vibrating means mechanically coupled to vibrate said nozzle for exciting said vibrating means at a desired frequency, means for electrostatically charging said discrete droplets in accordance with the instantaneous values of an input signal, a pair of electrostatic deflection electrodes positioned, respectively, on opposite sides of said stream and means for applying a constant unidirectional electrostatic charge to said deflecting electrodes to produce a constant electric field therebetween whereby to deflect the path of said droplets in their course between said nozzle and said record receiving member in accordance with the individual charge carried by said discrete droplets.

8. A direct writing recorder as set forth in claim 7 wherein said first and said second vibrating means are arranged to induce vibrations of said nozzle in respective vibration planes which are displaced substantially 90° from each other and wherein said first means is arranged to vibrate said nozzle substantially co-linearly with said stream.

9. A direct writing recorder as set forth in claim 8 wherein said means for exciting includes a common source of oscillatory signals, means connecting said signals directly to said first means, and a 90° phase shift means arranged to connect said signals to said second means.

10. A direct writing recorder as set forth in claim 7 wherein said first and said second vibrating means are symmetrically arranged with respect to said stream and are both displaced 45° from the path of said stream.

References Cited

UNITED STATES PATENTS 3,281,859  10/1966  Stone _____ 346—75
3,281,860  10/1966  Adams et al. _____ 346—75

RICHARD B. WILKINSON, *Primary Examiner.*

J. W. HARTARY, *Assistant Examiner.*